United States Patent
Pistoia et al.

(10) Patent No.: US 10,324,820 B2
(45) Date of Patent: Jun. 18, 2019

(54) PROVIDING SPECIALIZATION FOR STATIC PROGRAM ANALYSIS USING CODING HINTS

(71) Applicant: International Business Machines Corporation, Armonk, NY (US)

(72) Inventors: Marco Pistoia, Amawalk, NY (US); Omer Tripp, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 15/271,993

(22) Filed: Sep. 21, 2016

(65) Prior Publication Data
US 2018/0081789 A1    Mar. 22, 2018

(51) Int. Cl.
*G06F 11/36*    (2006.01)

(52) U.S. Cl.
CPC ................ *G06F 11/3604* (2013.01)

(58) Field of Classification Search
CPC .................................................. G06F 11/3668
USPC .......................................................... 717/127
See application file for complete search history.

(56) References Cited

U.S. PATENT DOCUMENTS

| 9,727,736 B1* | 8/2017 | McClintock | G06F 21/577 |
| 2005/0044533 A1* | 2/2005 | Nesbit | G06F 11/3688 717/124 |
| 2012/0131670 A1* | 5/2012 | Artzi | G06F 21/00 726/22 |
| 2013/0085811 A1* | 4/2013 | Darden | G06Q 10/00 705/7.38 |
| 2014/0189657 A1* | 7/2014 | Guarnieri | G06F 11/3604 717/133 |

* cited by examiner

*Primary Examiner* — Li B. Zhen
*Assistant Examiner* — Zengpu Wei
(74) *Attorney, Agent, or Firm* — Scully, Scott, Murphy & Presser, P.C.; Daniel P. Morris, Esq.

(57) ABSTRACT

Providing specialization for a static program analysis procedure by executing an automated agent to monitor a code authoring process for a program under examination that includes a plurality of respective lexical scopes. The agent monitors a corresponding amount of coding time, or a corresponding number of edits, for each of the plurality of respective lexical scopes. A mapping associates each of the plurality of respective lexical scopes with a first quantitative measure of the corresponding amount of time, or a second quantitative measure of the corresponding number of edits, that were used to code each of the plurality of respective lexical scopes. The static analysis procedure is specialized by applying a more refined, detailed, precise, or granular analysis to a first lexical scope that is mapped to a greater amount of time or a greater number of edits than a second lexical scope.

20 Claims, 2 Drawing Sheets

PROVIDING SPECIALIZATION FOR STATIC PROGRAM ANALYSIS USING CODING HINTS

FIELD

The present application relates generally to static program analysis and, more particularly, to techniques for providing specialization for static program analysis methods using coding hints gathered during a code authoring process.

BACKGROUND

Code verification and validation is the process of determining that a software program meets all specifications and fulfills its intended purpose. Code verification addresses the issue of the software program achieving its goals without any bugs or gaps. On the other hand, code validation ascertains whether or not the software meets high-level requirements and addresses the problem to be solved. Code verification ensures that "you built it right". Code validation ensures that "you built the right thing".

Static program analysis refers to analyzing computer software without actually executing the software. Static program analysis has been shown to be of great value in automating code verification tasks. Examples include functional verification tools such as Coverity™, as well as security analysis tools such as IBM Security AppScan Source Edition™ and HP Fortify 360™. One challenge faced by all tools based upon static program analysis is to achieve a proper balance between accuracy and scalability. These two considerations are in conflict. Precision is achieved by building a granular albeit expensive analysis model. Scalability requires the opposite—a lightweight and less descriptive model.

Various analysis specialization techniques have been developed in an attempt to address the inherent tradeoff between accuracy and scalability. One set of techniques provides specialization for certain forms of static analysis according to one or more concrete runs of the program. Another approach applies randomized algorithms inspired by a theory called machine learning. Yet another approach, termed Counter-Example Guided Abstraction Refinement (CEGAR) refines an abstraction guided by false counterexample traces. All three of the foregoing techniques may potentially improve the ability of the static program analysis procedure to scale while remaining precise. The specialization process, however, is expensive and requires its own set of non-trivial analyses. Thus, there exists a need to overcome at least one of the preceding deficiencies and limitations of the related art.

SUMMARY

The following summary is merely intended to be exemplary. The summary is not intended to limit the scope of the claims.

A computer-executed method that provides specialization for a static analysis procedure to be applied to a program under examination, in one aspect, comprises executing an automated monitoring agent to monitor a code authoring process for the program under examination, wherein the program under examination includes a plurality of respective lexical scopes; the monitoring agent configured for monitoring a corresponding amount of coding time, or a corresponding number of edits, or both, for each of the plurality of respective lexical scopes; obtaining from the monitoring agent a mapping between each respective lexical scope of the plurality of lexical scopes and at least one of: a first quantitative measure of the corresponding amount of time, or a second quantitative measure of the corresponding number of edits, that were used to code each respective lexical scope of the plurality of lexical scopes into the program under examination during the code authoring process; and specializing the static analysis procedure by applying a more refined, detailed, precise, or granular analysis to a first lexical scope that is mapped to a greater amount of time or a greater number of edits than a second lexical scope.

A computer program product that provides specialization for a static analysis procedure to be applied to a program under examination, in another aspect, comprises a non-transitory computer-readable storage medium having a computer-readable analysis program stored therein, wherein the computer-readable analysis program, when executed on a computer system comprising at least one processor, causes the computer system to execute an automated monitoring agent to monitor a code authoring process for the program under examination, wherein the program under examination includes a plurality of respective lexical scopes; the monitoring agent configured to monitor a corresponding amount of coding time, or a corresponding number of edits, or both, for each of the plurality of respective lexical scopes; obtain from the monitoring agent a mapping between each respective lexical scope of the plurality of lexical scopes and at least one of: a first quantitative measure of the corresponding amount of time, or a second quantitative measure of the corresponding number of edits, that were used to code each respective lexical scope of the plurality of lexical scopes into the program under examination during the code authoring process; and specialize the static analysis procedure by applying a more refined, detailed, precise, or granular analysis to a first lexical scope that is mapped to a greater amount of time or a greater number of edits than a second lexical scope.

An apparatus that provides specialization for a static analysis procedure to be applied to a program under examination, in another aspect, may comprise a processor and a non-transitory computer-readable memory coupled to the processor, wherein the memory comprises instructions which, when executed by the processor, cause the processor to execute an automated monitoring agent to monitor a code authoring process for the program under examination, wherein the program under examination includes a plurality of respective lexical scopes; the monitoring agent configured to monitor a corresponding amount of coding time, or a corresponding number of edits, or both, for each of the plurality of respective lexical scopes; obtain from the monitoring agent a mapping between each respective lexical scope of the plurality of lexical scopes and at least one of: a first quantitative measure of the corresponding amount of time, or a second quantitative measure of the corresponding number of edits, that were used to code each respective lexical scope of the plurality of lexical scopes into the program under examination during the code authoring process; and specialize the static analysis procedure by applying a more refined, detailed, precise, or granular analysis to a first lexical scope that is mapped to a greater amount of time or a greater number of edits than a second lexical scope.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

In order to address the inherent tradeoff between precision and scalability, researchers and practitioners in the area of static program analysis have developed an approach called analysis specialization. Pursuant to this approach, one or more behaviors implemented by the analysis are not uniform across all programs, but rather change from one program to the next, depending on the particular characteristics of a program under examination. The one or more behaviors may relate to a depth and a precision of a model that is employed to perform the static program analysis, as well as a set of bounds that are established for the model.

Analysis specialization may be performed by relaxing or coarsening the static program analysis procedure to exploit discounts featured by the program under examination. As a simple example, the analysis may become expensive due to the need to precisely account for certain string operations. However, the program under examination might not make use of any of these operations, and so there is no need to perform the analysis at the most precise level. Another example is a program containing assertions at certain points that the analysis needs to verify. In this situation, a set of required proof goals may be relaxed.

Figure 1:
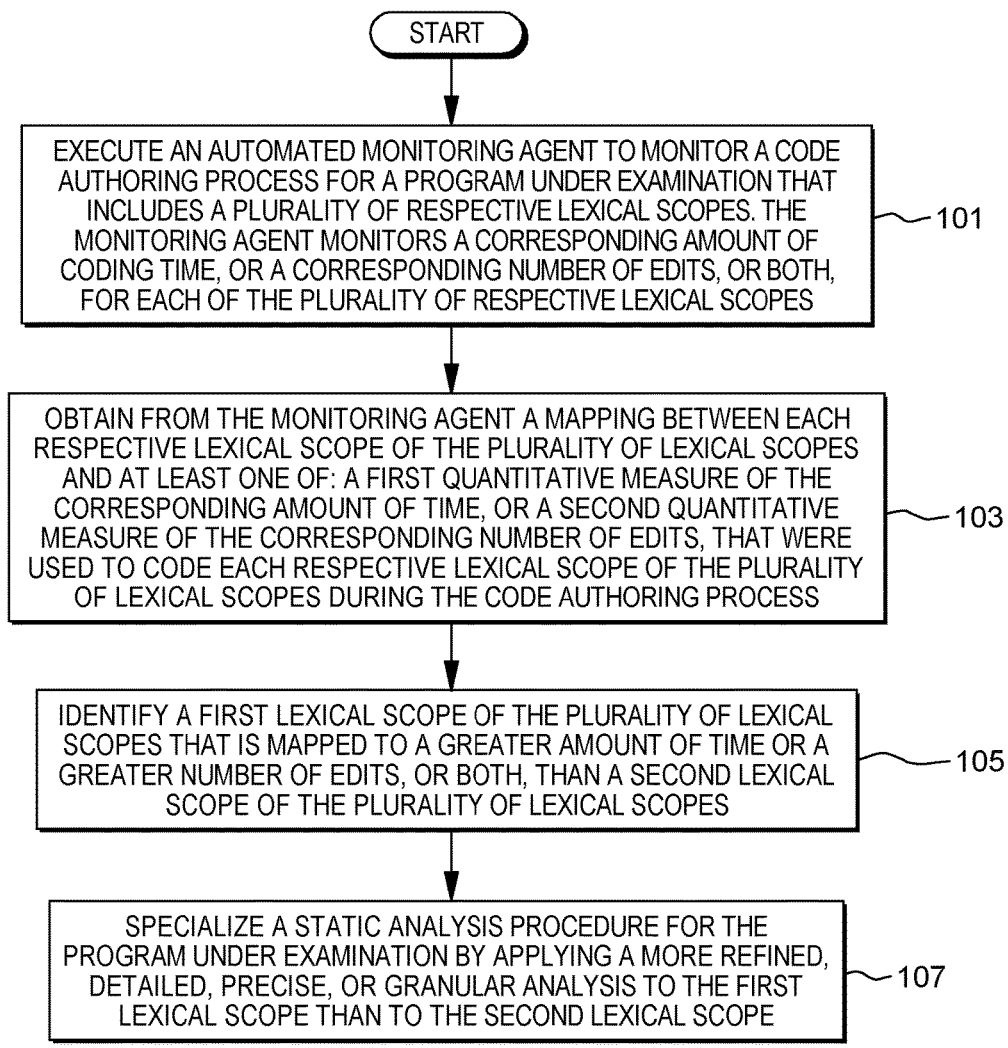
FIG. 1 is a flowchart illustrating an exemplary method that provides specialization for a static analysis procedure to be applied to a program under examination.

FIG. 1 is a flowchart illustrating an exemplary method that provides specialization for a static analysis procedure to be applied to a program under examination. The procedure commences at block 101 where an automated monitoring agent is executed to monitor a code authoring process for the program under examination. The program under examination includes a plurality of respective lexical scopes. The monitoring agent monitors a corresponding amount of coding time, or a corresponding number of edits, or both, for each of the plurality of respective lexical scopes. As used herein, the term "agent" refers to a persistent, goal-oriented computer program that reacts to its environment and runs without continuous direct supervision to perform some function for an end user, or for another program. Some, but not all, agents have user interfaces (UIs). Agents represent an evolutionary step beyond conventional computer programs. Agents can activate and run themselves, not requiring input from or interaction with a human user. Agents can also initiate, oversee, and terminate other programs or agents including applications and online intelligent agents.

Each of the plurality of respective lexical scopes (sometimes referred to as static scopes) constitute a convention used with many programming languages where a respective scope (a range of functionality) is defined for a corresponding variable so that the variable may only be called (referenced) from within a block or region of code in which the variable is defined. The scope of a name binding—an association of a name to an entity such as a variable—may be defined as that part of a computer program where the binding is valid, such that the name can be used to refer to that entity. In other parts of the program, the name may refer to a different entity (the name may have a different binding), or the name may refer to nothing at all (the name may be unbound).

The lexical scope is a part of a program that is or can be the scope for a set of bindings and may correspond to a block, a function, a file, a class, a method, a package, a loop, or a condition. Alternatively or additionally, the scope may be regarded as a set of all entities that are visible and all names that are valid within a portion of the program or at a given point in the program. This portion of the program refers to a portion of the source code or an area of text. The scope of a binding is sometimes referred to as a visibility of an entity, particularly from the perspective of the referenced entity. The scope is determined when the code is compiled. A variable declared in this fashion is sometimes called a private variable. The opposite approach is known as dynamic scoping. Dynamic scoping creates variables that can be called from outside the block of code in which they are defined. A variable declared in this fashion is sometimes called a public variable.

The operational sequence progresses to block 103 where a mapping is obtained from the monitoring agent. The obtained mapping maps each respective lexical scope of the plurality of lexical scopes to least one of: a first quantitative measure of the corresponding amount of time, or a second quantitative measure of the corresponding number of edits, that were used to code each respective lexical scope of the plurality of lexical scopes into the program under examination during the code authoring process. When the monitoring agent monitors the amount of coding time or the number of edits, or both, these monitored parameters comprise coding hints that are indicative of a level of complexity, or a level of criticality, or a level of complexity and criticality, for each of the one or more lexical scopes. For example, if a software developer is writing a web application, then large portions of code for the application are straightforward to implement, either directly, or even more easily, by using web frameworks. However, when it comes to an implementation of certain specific defense measures, then the developer is likely to spend more time working out the exact implementation of each defense.

For purposes of illustration, the code authoring process may take place in an integrated development environment (IDE). The IDE is a software suite that consolidates a group of basic tools used by developers to write and test software. Typically, the IDE contains a code editor, a compiler or interpreter, and a code debugger that the developer accesses through a single graphical user interface (GUI). The IDE may be a standalone application, or it may be included as part of one or more existing and compatible applications. The IDE may provide a toolbar that looks similar to a toolbar on a word processing program. The tools in the toolbar facilitate color-coding, source-code formatting, error diagnostics, error reporting, and intelligent code completion. The interface allows the developer to compile and execute code incrementally, and manage edits and changes to source code in a uniform manner.

IDEs offer integrated tools that are configured for measuring the amount of coding time of a program under development. However, in situations where IDEs are not used, the amount of coding time can be determined directly from a text editor program. Also, if the static program analysis is applied to a binary/bytecode version of the code, then coding time information and editing time information could be obtained for that level by establishing a mapping with the source code.

Increasingly, IDEs are being offered through a software-as-a-service (SaaS) delivery model. The benefits of cloud IDEs include accessibility to software development tools from anywhere in the world, from any compatible device;

minimal to nonexistent download and installation; and ease of collaboration among geographically dispersed developers. Popular SaaS-based IDE tools include NetBeans™, Eclipse™, IntelliJ™, Visual Studio™, and Windows PowerShell™.

Next, the operational sequence progresses to block 105 where a first lexical scope of the plurality of lexical scopes is identified that is mapped to a greater amount of time or a greater number of edits, or both, than a second lexical scope of the plurality of lexical scopes. Then, at block 107, the static analysis procedure is specialized by applying a more refined, detailed, or precise analysis to the first lexical scope than to the second lexical scope. From the perspective of the second lexical scope, since the second lexical scope took less time to code than the first lexical scope, or required a fewer number of edits than the first lexical scope, a coarser analysis is applied to the second lexical scope than to the first lexical scope.

The specialized static security analysis procedure of FIG. 1 draws cues and hints from the software development process, modeling more carefully any behaviors associated with relatively complex portions of code, and using coarse modeling on relatively non-critical portions of code. For example, assume that a program under examination includes a first section of code related to customized defense measures, and a second section of code that is routine and lacks complexity. Using the procedure of FIG. 1, a precise but relatively complex string analysis can be employed to model the defense measures. Coarse modeling, such as a standard taint analysis procedure, can be applied to the second section of code. Although the static security analysis procedure may not be aware of the semantic separation between the defense measures and the rest of the code, the procedure can distinguish between the defense measures and the rest of the code based on the time spent by the developer on writing or editing these different aspects of the code.

The static program analysis procedure of FIG. 1 may be implemented using any analysis tool that is performed without actually executing the code of a software program under examination. In some cases, the analysis is performed on source code, and in other cases, the analysis is performed on object code. In general, static program analysis takes place within a specific program or subroutine, out connecting to the context of that program.

Static program analysis may be performed on any of three basic levels. These include a technology level, a system level, and a mission/business level. The technology level takes into account interactions between a plurality of unit programs to obtain a holistic and semantic view of the overall program in order to locate issues and avoid obvious false positives. The system level takes into account interactions between unit programs, but without being limited to one specific technology or programming language. The mission/business level takes into account terms, rules and processes that are implemented within the software system for its operation as part of enterprise or program/mission layer activities. These elements are implemented without being limited to one specific technology or programming language and in many cases are distributed across multiple languages but are statically extracted and analyzed for system understanding for mission assurance.

Formal methods may be used to implement static program analysis. Formal methods refers to a category of analysis tools where results are obtained purely through the use of rigorous mathematical methods. Mathematical techniques such as denotational semantics, axiomatic semantics, operational semantics, abstract interpretation, or any of various combinations thereof may be employed. However, using formal methods to locate all possible run-time errors in an arbitrary program (or more generally any kind of violation of a specification on the final result of a program) is an undecidable problem. No mathematical method exists that can always answer truthfully whether an arbitrary program may or may not exhibit runtime errors. This result dates from the works of Church, Gödel and Turing in the 1930s. As with many undecidable questions, one can still attempt to provide useful approximate solutions.

In practice, formal static program analysis may be implemented using model checking, data-flow analysis, abstract interpretation, Hoare logic, symbolic expression, or any of various combinations thereof. Model checking considers software that has finite states, or that may be reduced to finite states by abstraction. Data-flow analysis is a lattice-based technique for gathering information about a possible set of values. Abstract interpretation models an effect that each of a plurality of statements has on a state of an abstract machine. The software is "executed" based on the mathematical properties of each statement. However, this abstract machine over-approximates the behaviors of the software. The abstract software is thus made simpler to analyze, at the expense of incompleteness. Not every property true of the original software will be true of the abstracted software. If performed properly, abstract interpretation is a sound technique. Every property true of the abstracted software can be mapped to a true property of the original software.

Hoare logic is a formal system with a set of logical rules for reasoning rigorously about the correctness of computer programs. Symbolic execution is another formal system that is used to derive mathematical expressions representing values for a plurality of mutated variables at particular points in the code.

Figure 2:
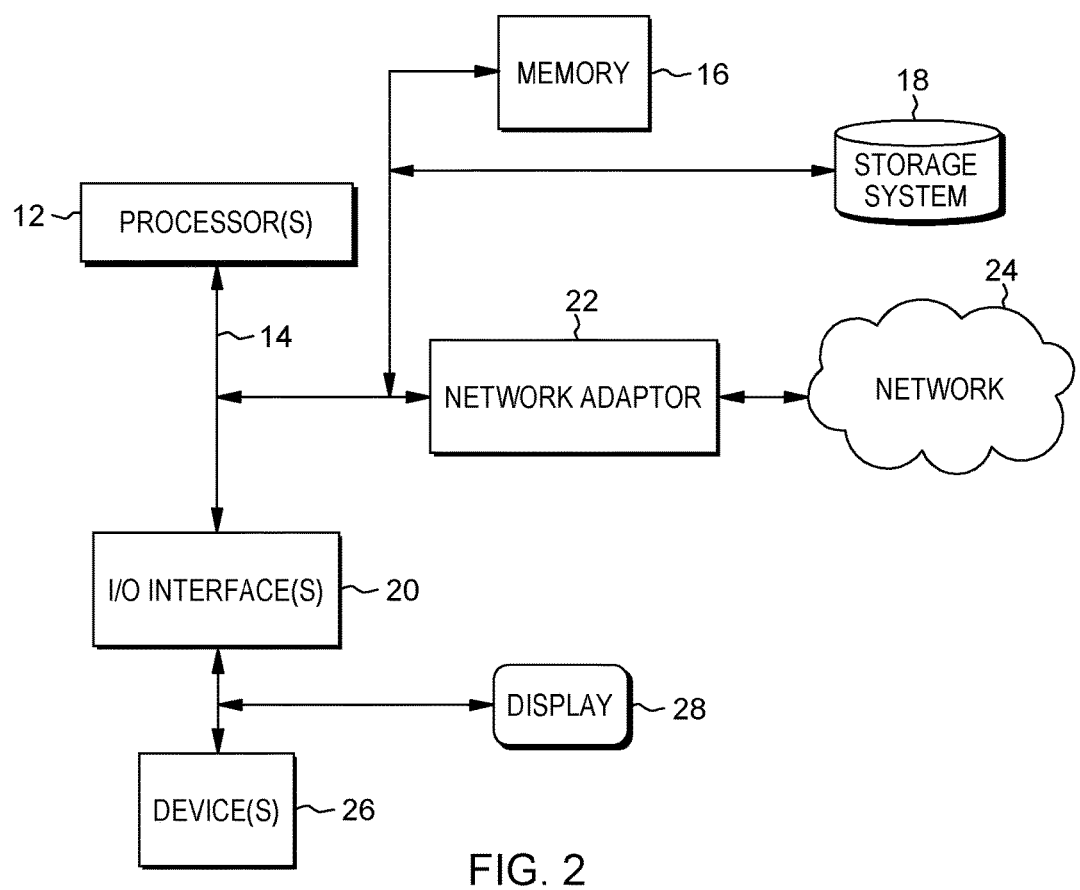
FIG. 2 is a hardware block diagram of an exemplary computer or processing system that may implement the method of FIG. 1, in one set of embodiments of the present disclosure.

FIG. 2 illustrates a schematic of an exemplary computer or processing system that may implement the method of FIG. 1, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-executed method that provides specialization for a static program analysis procedure to be applied to a program under examination, the method comprising:
    executing an automated monitoring agent to monitor a code authoring process for the program under examination, wherein the program under examination includes a plurality of respective lexical scopes, the monitoring agent configured for monitoring an amount of coding time and a number of edits that were used to code each of the plurality of respective lexical scopes into the program under examination during the code authoring process;
    obtaining from the monitoring agent a mapping between each of the plurality of respective lexical scopes to a quantitative measure, wherein the quantitative measure comprises at least one of the amount of coding time and the number of edits monitored by the monitoring agent for each of the plurality of respective lexical scopes;
    identifying, from the mapping, a first lexical scope among the plurality of respective lexical scopes, wherein the first lexical scope is mapped to a first quantitative measure, and the identifying is based on the first quantitative measure being greater than a second quantitative measure mapped to a second lexical scope among the plurality of respective lexical scopes;
    applying a first static analysis among the static analysis procedure to employ a precise model to analyze the first lexical scope; and
    applying a second static analysis among the static analysis procedure to employ a coarse model to analyze the second lexical scope, wherein a complexity of the precise model employed by the first static analysis is greater than a complexity of the coarse model employed by the second static analysis.

2. The method of claim 1 wherein each of the plurality of respective lexical scopes is defined for a corresponding variable so that the corresponding variable may only be referenced from within a block or region of code in which the variable is defined.

3. The method of claim 1 wherein each of the plurality of respective lexical scopes comprises at least one of a block, a function, a file, a class, a method, a package, a loop, a condition, or a region of code in the program under examination.

4. The method of claim 1 further comprising implementing the automated monitoring agent using an integrated development environment.

5. The method of claim 1 wherein applying the first static analysis comprises applying a string analysis procedure to the first lexical scope.

6. The method of claim 1 wherein applying the second static analysis comprises applying a taint analysis procedure to the second lexical scope.

7. The method of claim 1 wherein the specialized static program analysis procedure is performed using a formal technique comprising model checking, data-flow analysis, abstract interpretation, Hoare logic, symbolic expression, or any of various combinations thereof.

8. An apparatus that provides specialization for a static analysis procedure to be applied to a program under examination, the apparatus comprising a processor and a non-transitory computer-readable memory coupled to the processor, wherein the memory comprises instructions which, when executed by the processor, cause the processor to:
   execute an automated monitoring agent to monitor a code authoring process for the program under examination, wherein the program under examination includes a plurality of respective lexical scopes, the monitoring agent configured to monitor an amount of coding time and a number of edits that were used to code each of the plurality of respective lexical scopes into the program under examination during the code authoring process;
   obtain from the monitoring agent a mapping between each respective lexical scope of the plurality of lexical scopes to a quantitative measure, wherein the quantitative measure comprises at least one of the amount of time and the number of edits monitored by the monitoring agent for each respective lexical scope of the plurality of lexical scopes;
   identify, from the mapping, a first lexical scope among the plurality of respective lexical scopes, wherein the first lexical scope is mapped to a first quantitative measure, and the identifying is based on the first quantitative measure being greater than a second quantitative measure mapped to a second lexical scope among the plurality of respective lexical scopes;
   apply a first static analysis among the static analysis procedure to employ a precise model to analyze the first lexical scope; and
   apply a second static analysis among the static analysis procedure to employ a coarse model to analyze the second lexical scope, wherein a complexity of the precise model employed by the first static analysis is greater than a complexity of the coarse model employed by the second static analysis.

9. The apparatus of claim 8 further configured for defining each of the plurality of respective lexical scopes for a corresponding variable so that the corresponding variable may only be referenced from within a block or region of code in which the variable is defined.

10. The apparatus of claim 8 wherein each of the plurality of respective lexical scopes comprises at least one of a block, a function, a file, a class, a method, a package, a loop, a condition, or a region of code in the program under examination.

11. The apparatus of claim 8 further configured for implementing the automated monitoring agent using an integrated development environment.

12. The apparatus of claim 8 wherein the application of the first static analysis comprises an application of a string analysis procedure to the first lexical scope.

13. The apparatus of claim 8 wherein the application of the second static analysis comprises an application of a taint analysis procedure to the second lexical scope.

14. The apparatus of claim 8 further configured for performing the specialized static program analysis procedure using a formal technique comprising model checking, data-flow analysis, abstract interpretation, Hoare logic, symbolic expression, or any of various combinations thereof.

15. A computer program product that provides specialization for a static analysis procedure to be applied to a program under examination, the computer program product comprising a computer-readable storage medium having a computer-readable analysis program stored therein, wherein the computer-readable analysis program, when executed on a computer system comprising at least one processor, causes the processor to:
   execute an automated monitoring agent to monitor a code authoring process for the program under examination, wherein the program under examination includes a plurality of respective lexical scopes the monitoring agent configured to monitor an amount of coding time and a number of edits that were used to code each of the plurality of respective lexical scopes into the program under examination during the code authoring process;
   obtain from the monitoring agent a mapping between each respective lexical scope of the plurality of lexical scopes to a quantitative measure, wherein the quantitative measure comprises at least one of the amount of time and the number of edits monitored by the monitoring agent for each respective lexical scope of the plurality of lexical scopes;
   identify, from the mapping, a first lexical scope among the plurality of respective lexical scopes, wherein the first lexical scope is mapped to a first quantitative measure, and the identifying is based on the first quantitative measure being greater than a second quantitative measure mapped to a second lexical scope among the plurality of respective lexical scopes;
   apply a first static analysis among the static analysis procedure to employ a precise model to analyze the first lexical scope; and
   apply a second static analysis among the static analysis procedure to employ a coarse model to analyze the second lexical scope, wherein a complexity of the precise model employed by the first static analysis is greater than a complexity of the coarse model employed by the second static analysis.

16. The computer program product of claim 15 further configured for defining each of the plurality of respective lexical scopes for a corresponding variable so that the corresponding variable may only be referenced from within a block or region of code in which the variable is defined.

17. The computer program product of claim 15 wherein each of the plurality of respective lexical scopes comprises at least one of a block, a function, a file, a class, a method, a package, a loop, a condition, or a region of code in the program under examination.

18. The computer program product of claim 15 further configured for implementing the automated monitoring agent using an integrated development environment.

19. The computer program product of claim 15 wherein the application of the first static analysis comprises an application of a string analysis procedure to the first lexical scope.

20. The computer program product of claim 15 wherein the application of the second static analysis comprises an application of a taint analysis procedure to the second lexical scope.

* * * * *